United States Patent [19]

Voirin et al.

[11] 4,283,380

[45] Aug. 11, 1981

[54] PROCESS AND INSTALLATION FOR DESULPHURIZING GASES CONTAINING SO₂

[75] Inventors: Robert Voirin, Mourenx; Pierre Mathieu, Orthez; Claude Chambu, Billere, all of France

[73] Assignee: Societe Nationale Elf Aquitaine (Production), France

[21] Appl. No.: 731,654

[22] Filed: Oct. 12, 1976

[30] Foreign Application Priority Data

Oct. 10, 1975 [FR] France ................................ 75 31162
Oct. 4, 1976 [FR] France ................................ 76 29756

[51] Int. Cl.³ ............................................. C01B 53/34
[52] U.S. Cl. .............................. 423/574 R; 423/244; 423/76; 55/73
[58] Field of Search ............... 423/244, 570, 574, 576; 55/73, 74

[56] References Cited

U.S. PATENT DOCUMENTS

| | | | |
|---|---|---|---|
| 1,836,357 | 12/1931 | Benner et al. | 423/570 |
| 2,747,968 | 5/1956 | Pigache | 423/230 |
| 2,992,884 | 7/1961 | Bienstock | 423/244 |
| 3,755,535 | 8/1973 | Naber | 423/244 |
| 3,917,799 | 11/1975 | Torrence | 423/576 |
| 4,008,169 | 2/1977 | McGauley | 423/244 |
| 4,014,982 | 3/1977 | Paull et al. | 423/523 |

FOREIGN PATENT DOCUMENTS 1353606 1/1964 France .
1508644 11/1967 France .

OTHER PUBLICATIONS

Pearson, M. J.; "Catalysts for Claus Process" Kaiser Aluminum & Chem. Corp.; 1972 pp. 14–15. Pat. 3,386

*Primary Examiner*—G. O. Peters
*Attorney, Agent, or Firm*—Ostrolenk, Faber, Gerb & Soffen

[57] ABSTRACT

In a process for desulphurizing gases containing $SO_2$ and $SO_3$ by absorption of the sulphur containing compounds by means of absorbents based on alumina free of alkaline substances, activated alumina or alumina carrying salts or oxides of at least one element selected from the groups IB, IIB, IVB, VB, VIB, VIIB, VIII of the Periodic Classification, the absorption takes place at temperatures comprised between 100° and 400° C., and the absorbent loaded with said compounds in the form of sulphates is heated with a gas containing a reducing gas, especially $H_2S$, to a temperature of 250° C. to 450° C., while the elementary sulphur thus formed is separated from said absorbent, whereafter the latter is re-used in a subsequent absorption operation.

11 Claims, 1 Drawing Figure

U.S. Patent  Aug. 11, 1981  4,283,380
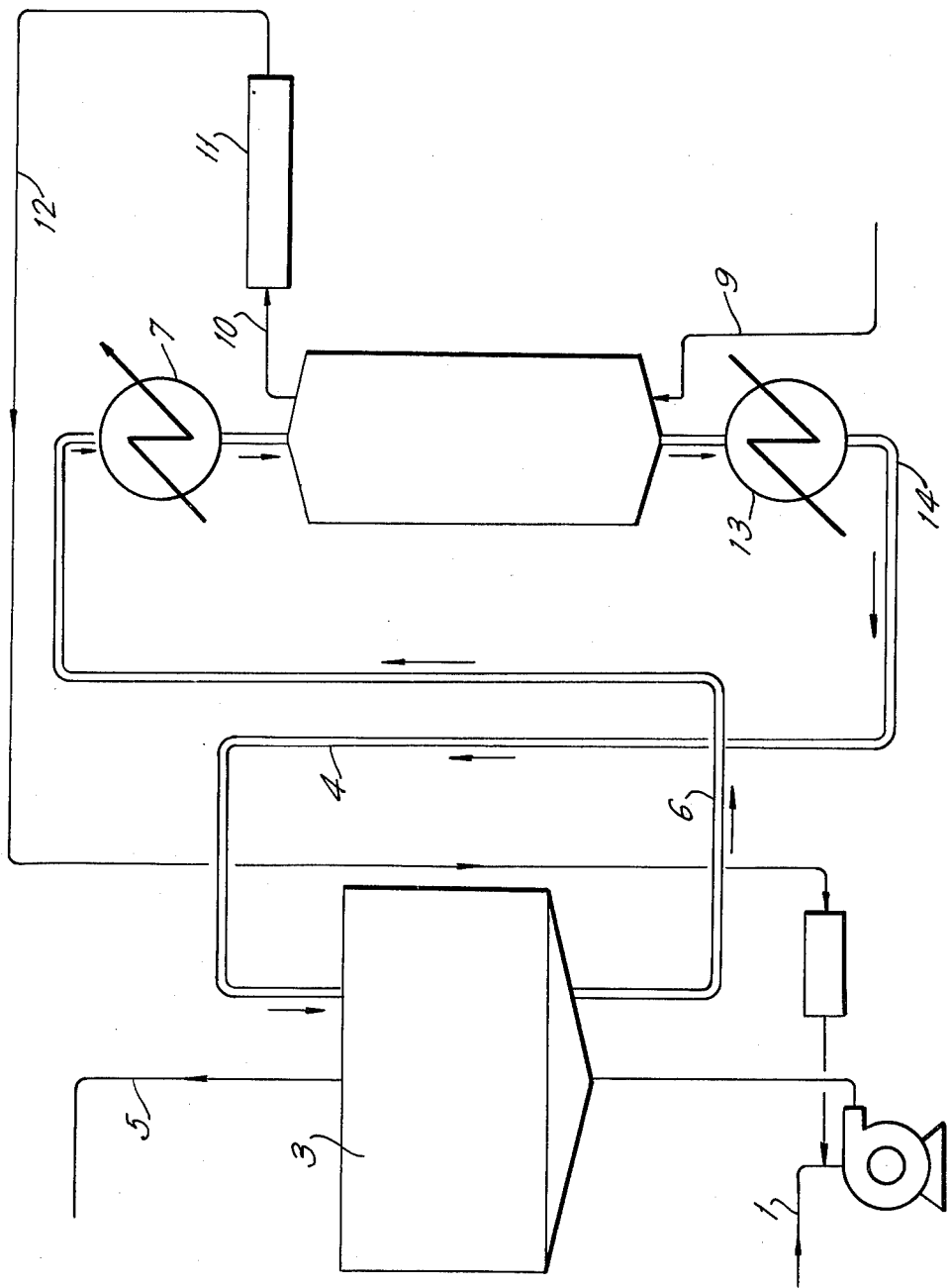

PROCESS AND INSTALLATION FOR DESULPHURIZING GASES CONTAINING $SO_2$

The present invention is related to the elimination of sulphur-containing compounds, particularly of $SO_2$, from various gases, and especially from fumes. The invention has for one of its objects a method based on the absorption of these compounds by means of absorbents containing non-alkalized alumina and their recovery in the form of elementary sulphur in the course of a regeneration process specially adapted to the conditions of the treated medium.

The Applicant has already provided a method of treating residuary gases containing sulphur by means of alumina, which method comprises the adsorption of $SO_2$, $H_2S$ and other sulphur containing compounds, followed by a regeneration treatment of the alumina by desorption using a hot air current, this method being disclosed in the French Patent specification No. 1,353,606 of Jan. 17, 1963. This known method uses a granular alumina, particularly an alumina having a grain size of 2 to 5 mm. According to other known methods disclosed in the prior publications, which use alumina as an adsorbent, this material is used in a alkalized state, i.e. combined with a substantial amount of a basic compound of an alkali metal, mainly of sodium. A method of this kind is disclosed in U.S. Pat. No. 2,992,884 dated June 18th., 1961, whereas the different alkalized alumina compositions are described in the Investigation Report No. 7 582 of the U.S. Home Ministry under the title of "Evaluation of some solid oxides as sulphur dioxide sorbents". This use of an alkalized adsorbent appeared plausible to those skilled in the art, as an alkaline material would more easily absorb acid gases such as $SO_2$, $SO_3$, $NO_2$ and so on. However, the alkalized alumina compounds, especially alkalized sodium alumina, once saturated by the compounds eliminated from the treated gas, especially $SO_2$ or $SO_3$, are difficult to regenerate. The above-mentioned Report No. 7 582 indicates, for example, on pages 6 and 10, that the regeneration of the catalyst (containing in this case high amounts of alkaline sulphates) by means of hydrogen requires temperatures of at least 500° C. to 700° C. Such elevated temperatures result in a deterioration of the porous structure of the alumina, the adsorption capacity of which decreases from one cycle to the other. Furthermore, such elevated temperatures are an important factor of enhancing the corrosion of the installations.

When temperatures lower than 500° C. to 700° C. are used, which would allow one to avoid the deterioration of the alumina and the corrosion, this results in a lower sulphur reduction of the alkaline sulphates, entailing, in turn, a saturation of the alkaline sites, whereby the amount of absorbed sulphur containing compounds decreases considerably, as shown by the results hereinbelow.

Using another adsorbent, to wit active carbon, the WESTVACO CORPORATION has realized a mode of regeneration consisting in treating the carbon containing $H_2SO_4$ formed from the adsorbed $SO_2$, with hydrogen sulphide so as to set free all the sulphur in the form of elementary sulphur (Chemical Eng. progr., vol. 68, No. 8, April 1972).

A method of regeneration using $H_2S$ has been applied to alkalized alumina, as disclosed in the French Patent application No. 73 21 841 in the name of Princeton Chemical Research, Inc., published as French Patent Specification No. 2,189,113. However, the regeneration of used alkalized alumina is hardly possible at temperatures below 500° C., and such temperature already results in a deterioration of the adsorbent substance by destruction of the porous structure; it is set forth indeed, on pages 6 (lines 25 to 28) and 7 (lines 11 to 14) of the above mentioned publication, that after the regeneration, the rate of elimination of $SO_2$ from the gas decreases rapidly and reaches a value as low as 18.2% after 4½ hours' operation during the second absorption phase, and a value of 15.7% after 7 hours' operation during the third absorption phase.

The present invention provides a considerable improvement to the desulphurization of gases containing $SO_2$ and nitrogen oxides by means of alumina-based absorbents; indeed, due to the invention it is possible to improve considerably the efficiency of the regeneration (and thus of the consecutive absorption phase) of the absorbent substance saturated by the compounds that must be eliminated. Due to the invention, it is possible to effect this regeneration at temperatures substantially lower than 500° C., i.e. at temperatures at which the absorbing properties of alumina are not affected and at which the corrosion hazards are eliminated. Another advantage of the process according to the present invention resides in the fact that the absorption—or at least the beginning of the absorption—of the sulphur-containing compounds and nitrogen-containing compounds can be effected at or near the temperature of regeneration itself, whereby the necessity of cooling the absorbent between the regeneration and the treatment of the gases is eliminated. An important advantage is thus obtained as far as the consumption of energy, the required duration of the treatment and the amount of used catalyst are concerned.

The process according to the invention constitutes an improvement of the known processes, as it is particularly adapted to allow combustion gases carrying not only sulphur-containing compounds such as $SO_2$ and $SO_3$, but also oxygen and nitrogen oxides of the general formula $NO_x$, said improvement comprising the absorbing $SO_2$ and $SO_3$ as well as the nitrogen oxides by means of non-alkalized alumina-based absorbents, activated alumina alone or alumina carrying salts or oxides of at least one element selected from the groups IB, IIB, IVB, VB, VIB, VIIB or VIII of the Periodic Classification (Handbook of Chemistry and Physics) and more particularly, iron and/or titanium at temperatures comprised between 100° C. and 400° C., regenerating a part of the absorbent, and recovering, on the other hand, the sulphur by heating at a temperature on the order of 250° C. to 450° C. with a gas containing 5 to 50% hydrogen sulphide, so as to reduce the sulphates formed during the absorption of $SO_2$ and $SO_3$ to elementary sulphur, and simultaneously separate said sulphur from the absorbent. Due to the presence of $O_2$ and the nitrogen oxides in the gases to be treated (which is the case of the so-called "combustion gases"), it is possible to fix on the non-alkalized activated alumina or on the bauxite a considerable amount of $SO_2$ and $SO_3$ in the form of sulphates, the nitrogen oxides catalyzing the oxidation of $SO_2$ and $SO_3$ by means of the oxygen. These sulphates cannot be eliminated by a simple moderate thermal treatment such as disclosed in French Patent Specification No. 1,353,606, and thus would inhibit the consecutive absorption of $SO_2$. Furthermore, these known alumina sulphates can be reduced far more easily than the alkaline sulphates disclosed in the prior art, whereby it becomes possible to regenerate the absorbent at temperatures comprised between 200° C. and 450° C. With a view to avoid the risk of deterioration of the alumina of the absorbent and the risk of corrosion of the installation, it is preferable to carry out this regeneration at temperatures which do not exceed 400° C.

It should be pointed out that in the prior art a satisfactory epuration took place only at temperatures below 100° C. when non-alkalized alumina was used, and at temperatures of about 100° C. when alkalized alumina was used, whereas the process according to the present invention can advantageously be carried out at any temperature comprised between 100° C. and 400° C., whereby the novel process can be adapted to the temperatures of the fumes, which consequently need not be cooled.

Another reducing gas such as hydrogen or carbon monoxide may be used instead of $H_2S$, but according to the invention it is preferred to use $H_2S$; $H_2S$ is advantageous, furthermore, in that it allows one to selectively reduce the sulphates for obtaining directly recoverable sulphur.

According to an embodiment of the invention, the alumina-based absorbents can be constituted by activated alumina or alumina carrying either salts or oxides of the above mentioned elements or impurities contained in the adsorbant.

Said elements may be present in variable amounts on or in the alumina; it is nevertheless preferable that the proportions of these elements be not too high, and preferably be comprised between 0.1 and 3.0% of the weight of alumina so as to avoid blocking the active sites which allow the adsorption of $SO_2$. According to an embodiment of the invention, bauxites containing 0.5 to 1.5% iron and 0.5 to 1.0% titanium (in the form of titanium oxide) are particularly convenient; they present the advantage of being naturally available. On the contrary, alumina containing 4% iron has an adsorption capacity far lower than that of the activated alumina or of the bauxite. The use of bauxite presents other advantages: for identical temperature conditions, the regeneration rate of bauxite is 6 times that of the activated alumina alone. The regeneration temperature may also be reduced; this leads to considerable economic advantage.

Regeneration tests carried out at only 350° C. show that the regenerated bauxite presents a satisfactory $SO_2$-absorption capacity, which means that the desorption has been satisfactory too.

All these adsorbents allow substantially identical results to be obtained at the level of the adsorption phase; when the alumina carries certain elements, especially iron, the regeneration phase is far more rapid.

The process according to the invention can be performed by using a fixed bed or a fluidized bed of alumina or bauxite; the fluidized bed is constituted by very fine absorbent particles and allows achieving very high $SO_2$ absorption rates. It has been observed, indeed, according to the present invention, that a decrease of ten times of the alumina particle size results in an increase of 20% of the absorption power of the alumina.

According to the present invention, the alumina used has a specific surface of more than 50 $m^2/g$, preferably of between 150 and 500 $m^2/g$, said alumina being constituted by particles the dimensions of which depend on the process; the grain size varies between 50 and 1000 microns when a fluidized bed is used, and between 0.5 and 10 mm when a fixed bed is used.

The time of contact of the gas to be treated with the absorbent varies according to whether the process uses either a fixed bed or a fluidized bed. When a fixed bed is used, the contacting time can vary between 1 second and 10 seconds and is preferably comprised between 5 and 7 seconds. When a fluidized bed is used, the contacting time can be considerably reduced; it may then be comprised between 0.05 and 1 second, preferably between 0.3 and 0.5 second.

The invention will now be described by means of several examples which are given by way of illustration, but not of limitation.

EXAMPLE 1

Operation according to the invention

Activated alumina having a specific surface of 320 $m^2/g$ and a grain size of 2 to 5 mm is used.

330 ml of this alumina are introduced into a stainless steel reactor having an inner diameter of 3.5 m, said reactor being placed in an oven the temperature control system of which allows of operation according to an absorption-regeneration cycle; the absorption temperature is adjusted to 140° C., and the regeneration temperature is adjusted to 400° C. The gas to be purified contains 0.3% $SO_2$, 1.5% oxygen, 0.05% $NO_x$, 14% $CO_2$, 10% water, the balance being nitrogen. The flow rate is adjusted to 182 l/h as measured at 25° C. during the absorption phase, which corresponds to a contacting time of 6.6 seconds at 25° C.

The regeneration phases at 400° C. are effected by passing 234 l/h of a gas containing 10% $H_2S$, 10% steam, 14% $CO_2$, the balance being nitrogen.

The purification is continued during 50 cycles: the absorption phase of each cycle lasts 5 hours, and the regeneration phase lasts 3 hours. At the end of each phase, the sulphur fixed in the form of sulphate on the alumina of the reactor is determined.

The $SO_2$ elimination is complete during the first cycles, then slightly decreases, and reaches a stabilized rate at the fifteenth cycle. From this moment on, the $SO_2$ elimination rate during an absorption phase of 5 hours decreases from 100% to 71%, the average elimination rate during this period being 92%; this rate is maintained beyond the fiftieth cycle.

The result is an absorption capacity of 2.25 g $SO_2$ per 100 g activated nonalkalized alumina.

The amount of sulphates, expressed in terms of $SO_4^{--}$ present in the alumina after the absorption process is 4.4 g per 100 g absorbent, and only 1 g after regeneration; consequently the amount of sulphate reduced to sulphur is 3.4 g i.e. 77.3% of the absorbed amount (3.4:4.4).

EXAMPLE 1b is

Activated bauxite constituted by alumina, 0.5% iron, 0.5% titanium and 6.0% silica is used.

The operating conditions are identical to those described in Example 1, except that the regeneration time is 30 minutes instead of 180 minutes. The comparative results for the tests using alumina and bauxite respectively are given on Table 1b is.

The adsorption capacity of the bauxite is 2.2 g $SO_2$ per 100 g alumina. The activity of the bauxite is comparable to that of the alumina while the regeneration duration is 6 times lower than that of the bauxite.

EXAMPLE 2

Operation using alkalized alumina, and according to the other operating conditions set forth in Example 1

TABLE I $SO_2$ elimination rate, in %, as a function of time, during an absorption phase of 5 hours, after 50 cycles

| Number of hours | Example 1 Activated alumina according to the invention | | Example 2 Alkalized alumina according to the conditions set forth in Example 1 | | Example 3 French Patent Specification No. 2 189 112 |
|---|---|---|---|---|---|
| 1 h 30 mn | 100 | | 96.5 | | |
| 2 h | 100 | | 90,— | | |
| 2 h 30 mn | 97,— | | 85,— | | |
| 3 h | 92,— | Average 92% | 81,— | Average 85% | |
| 3 h 30 mn | 87,— | | 76.5 | | |
| 4 h | 80,— | | 74,— | | |
| 4 h 30 mn | 74,— | | 70,— | | |
| 5 h | 71,— | | 67,— | | after 3 cycles |
| 5 h 18 mn | | | | | 41.2 |

TABLE II

| | Example 1 Activated alumina according to the invention | Example 2 Alkalized alumina according the operating conditions of the prior art |
|---|---|---|
| Average $SO_2$ elimination rate during each absorption phase, after the 50th cycle | 92 | 85 |
| $SO_2$ absorption capacity per 100 g absorbent after the 50th cycle | 2.25 | 1.9 |

TABLE $SO_2$ elimination rate, in %, as a function of time, during an absorption phase: Comparison of alumina A and bauxite

| Number of hours | Activated alumina* according to the Example 1 | | Bauxite** | |
|---|---|---|---|---|
| 1 h 30 mn | 100 | | 100 | |
| 2 h | 100 | | 100 | |
| 2 h 30 mn | 97 | | 100 | |
| 3 h | 92 | | 100 | |
| 3 h 30 mn | 87 | Average 72% | 90 | Average 72% |
| 4 h | 80 | | 78 | |
| 4 h 30 mn | 74 | | 64 | |
| 5 h | 71 | | 50 | |

*Regeneration: 3 hours at 400° C.
**Regeneration: 30 minutes at 400° C.

The same activated alumina as that used in Example 1, having a specific surface of 320 m²/g, is used under identical conditions, said alumina having been, however, previously alkalized. To this end a solution of 103 g $Na_2CO_3$ in 600 ml water is added to 1 kg activated alumina. The resulting mixture is dried in a rotary evaporator under vacuum at 40° C., during 2 hours, then at 50° C. during 1 day and at 90° C. during 2 hours; the thus impregnated alumina is then heated in a vacuum oven at 120° C. during 4 hours. This alkalizing treatment corresponds to that disclosed in the French Patent Application No. 7 321 841. The alkalized alumina thus obtained has a specific surface of 250 m²/g and a Na-content of about 4%.

The absorption-regeneration cycles are effected as described in Example 1.

It is seen that during the first cycles the elimination of $SO_2$ from the gas is complete, whereafter the elimination rate decreases and reaches a stabilized value after 20 cycles. From this moment on, during the period of 5 hours, which is the duration of the absorption phase, the $SO_2$ elimination rate decreases from 100% to 67%; the average rate for 5 hours is 85%, and this value is maintained beyond the fiftieth cycle. Consequently, the absorption capacity of the alkalized alumina is 1.9 g $SO_2$ per 100 g alumina.

The amount of sulphate, expressed in terms of $SO_4^{--}$, is 11.4 g per 100 g absorbent (i.e. an absorption rate higher than that achieved when using non-alkalized alumina) prior to regeneration, and 8.5 g after regeneration; thus 2.9 g sulphates are reduced to elementary sulphur, which shows that only 25.43% sulphate is absorbed (2.9:11.4) as compared to 77.3% when nonalkalized alumina is used.

It will be seen that considerable differences exist between the results obtained respectively according to Example 1 and Example 2. These differences are clearly indicated in the tables herein, which tables also show the results obtained when known processes are applied.

It is clearly shown that the process according to the invention allows the average $SO_2$ elimination rate to be increased.

EXAMPLE 3

Operations identical to those described in Example 1 are carried out, however after each regeneration phase effected at 400° C. the temperature is not lowered to 140° C. prior to the absorption phase. The gas to be purified is passed directly to the regenerated alumina.

The results obtained are the same as those described in Example 1.

To resume, it may be stated that the novel combination according to the invention, which consists in effecting the absorption by means of non-alkalized activated alumina and regenerating said alumina by heating with a gas containing $H_2S$, leads to improved results, as compared to those obtained by the known processes using alkalized alumina and regeneration by means of an air stream, and also as compared to the known processes using alkalized alumina regenerated by means of a gas containing $H_2S$.

EXAMPLE 4

Industrial operation using a fluidized bed

Basic principle of the process

The gas to be purified (combustion gases) is introduced into a column with plates containing a fluidized bed of alumina. The $SO_2$ and $SO_3$ effluents are absorbed at 190° C. in this column.

The alumina is then heated to 400° C. and then introduced into a fluidized-bed exchanger, whereafter it flows in the form of a mobile bed through a regenerator wherein it encounters at counter-current a gas containing $H_2S$.

This alumina is then cooled to 190° C. and re-introduced into the absorber. The $H_2S$ is not transformed during the regeneration, and is burnt so as to provide $SO_2$, the latter being recycled in the fumes.

Description of the process for purifying the gas in a thermal power station of 125 Megawatts This purification process is performed by means of an installation shown in the appended drawing.

The gases of the power station, which enter through a conduit 1 with a flow rate of 375,000 Nm$^3$/h at a temperature of 170° C. and under a pressure of 1 bar, have the following composition: $CO_2$ 15%; $H_2O$ 10%; $O_2$ 1%; $SO_2$ 2000 ppm; $SO_3$ 20 ppm; $NO_x$ 500 ppm; $N_2 + CO + H_2$ balance to complete 100%.

These gases are compressed under a pressure of 1.08 bar by passing through a compressor 2 having a power of 1950 kW, whereby the temperature of the gases is raised to 190° C., said gases being then introduced into an absorber 3. This absorber of the fluidized bed type is designed so as to allow a 90% $SO_2$ elimination efficiency to be achieved; the absorber is constituted by a column having 4 plates, into which the alumina is introduced by a conduit 4 in a counter-current direction with respect to the flow of fumes.

The rate of absorption of $SO_2$ and $SO_3$ (and their transformation into sulphate) by the alumina used in this fluidized bed reactor (the particle size of which alumina is comprised between 50 and 1000 microns) is 3 g per 100 g alumina (3%), the flow rate of the fluidized alumina is 73 tons/hour, which corresponds to a contacting time of 0.1 second per plate. Since $SO_2$ issuing from the regenerator is recycled (slight regeneration), the efficiency of the absorber is decreased from 90% to 89.5%, as regards the fumes alone.

The purified fumes are eliminated through conduit 5; they contain 212 ppm $SO_2$.

The alumina containing 3% $SO_2$ in the form of sulphate is transferred through conduit 6 to a fluidized bed exchanger 7 having a capacity of $3.6 \times 10^6$ Kcal/h; the alumina is reheated to 400° C. and then flows by gravity in the form of a mobile bed to the regenerator 8, the dwelling time being 1 hour. A $H_2S$ current (flow rate: 2190 Nm$^3$/h) is conducted in countercurrent direction with respect to the alumina flow through conduit 9 and reduces the sulphates while producing sulphur vapor eliminated at 10 and condensed at 11. Under these dwelling conditions, the reduced sulphates correspond exactly to the 3% $SO_2$ which is fixed; the $H_2S$ regeneration gas is used up to the amount of 98%; the non used-up portion is burnt to form $SO_2$, then recycled at the absorber inlet by means of conduit 12, and it is absorbed in the same manner as the $SO_2$ coming from the power station.

The regenerated alumina is cooled to 190° C. in the exchanger 13; the calories thus can be partially recovered. The cooled alumina is then recycled toward the absorber by means of pneumatic feeding through conduit 14.

This process offers considerable advantages as compared to the fixed-bed process. It allows alumina having far smaller particles to be used, the absorbing power of which is at least 20% higher than that of the alumina used in the fixed-bed process. Another important advantage of the fluidized-bed process resides in the fact that the duration of the regeneration phase is substantially equal to the duration of the absorption phase, whereas in the fixed-bed process (Example 1) the absorption phase requires 5 hours and the regeneration phase 3 hours.

Furthermore, in the fluidized bed process, the regeneration of the alumina is substantially complete, while in the fixed-bed process only a 77.3% regeneration can be achieved (Example 1).

What is claimed is:

1. A process for desulphurizing gases containing $SO_2$ and $SO_3$, $O_2$ and nitrogen oxide by absorption of the sulphur containing compounds by means of an absorbent comprising contacting said gas with an activated alumina free of alkaline substances absorbent at a temperature between 100° and 400° C., heating the resulting absorbent loaded with said compounds in the form of alumina sulphates with a reducing gas at a temperature of 250° C. to 450° C., separating the elementary sulphur thus formed from said absorbent, and thereafter reusing the absorbent in a subsequent absorption operation.

2. The process of claim 1, wherein said absorbent has a specific surface of more than 50 m$^2$/g.

3. The process of claim 1 wherein said absorbent has a specific surface between 150 and 500 m$^2$/g.

4. The process of claim 2 wherein said absorption is effected in a fluidized bed and said alumina has a particle size of 50 to 1,000 microns.

5. The process of claim 2 wherein said absorption is effected in a fixed bed and said alumina has a particle size of 0.5 to 10 mm.

6. The process of claim 1 wherein said absorption is effected in a fixed bed and the time of contact between the gases to be treated and said absorbent is between 1 and 10 seconds.

7. The process of claim 1 wherein said absorption temperature is 140°–190° C.

8. The process of claim 1 wherein said absorption is effected in a fluidized bed and the time of contact between the gases to be treated and said absorbent is between 0.05 and 1 second.

9. The process of claim 1 wherein said reducing gas is hydrogen sulfide.

10. The process of claim 6 wherein said alumina has a specific surface between 150 and 500 m$^2$/g and a particle size of 0.5 to 10 mm and wherein said reducing gas is hydrogen sulfide.

11. The process of claim 8 wherein said alumina has a specific surface between 150 and 500 m$^2$/g and a particle size of 50 to 1,000 microns and wherein said reducing gas is hydrogen sulfide.

* * * * *